(12) United States Patent
Takeuchi et al.

(10) Patent No.: US 12,439,921 B2
(45) Date of Patent: Oct. 14, 2025

(54) PLANT PARASITIC NEMATODE CONTROL AGENT AND METHOD FOR CONTROLLING PLANT PARASITIC NEMATODE

(71) Applicant: Mitsui Chemicals Crop & Life Solutions, Inc., Tokyo (JP)

(72) Inventors: Haruka Takeuchi, Yokohama (JP); Yasumichi Onozaki, Yokohama (JP); Ryo Horikoshi, Yokohama (JP); Atsushi Sato, Yokohama (JP)

(73) Assignee: MITSUI CHEMICALS CROP & LIFE SOLUTIONS, INC., Tokyo (JP)

( * ) Notice: Subject to any disclaimer, the term of this patent is extended or adjusted under 35 U.S.C. 154(b) by 855 days.

(21) Appl. No.: 17/607,917

(22) PCT Filed: May 27, 2020

(86) PCT No.: PCT/JP2020/020955
§ 371 (c)(1),
(2) Date: Nov. 1, 2021

(87) PCT Pub. No.: WO2020/241702
PCT Pub. Date: Dec. 3, 2020

(65) Prior Publication Data
US 2022/0225618 A1  Jul. 21, 2022

(30) Foreign Application Priority Data
May 27, 2019  (JP) ................... 2019-098327

(51) Int. Cl.
*A01N 43/90* (2006.01)
*A01N 25/12* (2006.01)
*A01N 25/30* (2006.01)
*A01P 5/00* (2006.01)

(52) U.S. Cl.
CPC ............. *A01N 43/90* (2013.01); *A01N 25/12* (2013.01); *A01N 25/30* (2013.01); *A01P 5/00* (2021.08)

(58) Field of Classification Search
CPC .................................................... A01N 43/90
See application file for complete search history.

(56) References Cited

U.S. PATENT DOCUMENTS

2011/0263520 A1\* 10/2011 Horikoshi ............... A61P 33/00
514/250

FOREIGN PATENT DOCUMENTS

JP  10-245383 A  9/1998
WO  2008/156165 A1  12/2008
WO  WO2008/156165  \* 12/2008 ............. A01N 63/04
WO  2010/071218 A1  6/2010
WO  2010/071219 A1  6/2010

OTHER PUBLICATIONS

Gray et al., "Studies on the Biosynthesis of Asperparaline A: Origin of the Spirosuccinimde Ring System", Journal of American Chemical Society, 2003, vol. 125, No. 28, pp. 14692-14693.
Communication, dated Dec. 9, 2021, issued by the International Bureau in International Application No. PCT/JP2020/020955.
CMC Publishing Co., Ltd., "Trend in Pesticide Discovery Research", Development of safer and Environmentally friendly pesticides, 2018, pp. 128-135, Chapter 7.

(Continued)

*Primary Examiner* — Paul V Ward
(74) *Attorney, Agent, or Firm* — Sughrue Mion, PLLC

(57) ABSTRACT

The present invention provides a Tylenchoidea plant parasitic nematode control agent comprising: at least one compound selected from the group consisting of a compound represented by the following formula (1), a compound represented by the following formula (2), a compound represented by the following formula (3), enantiomers thereof, and agriculturally and horticulturally acceptable acid addition salts thereof as an active ingredient

[Chem. 1]

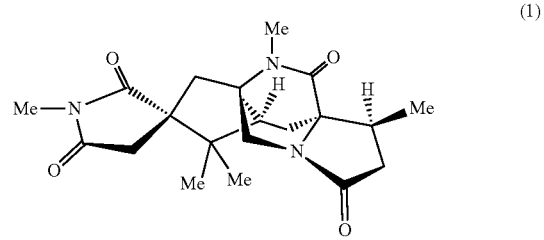

(1)

[Chem. 2]

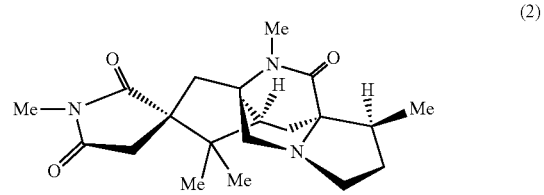

(2)

[Chem. 3]

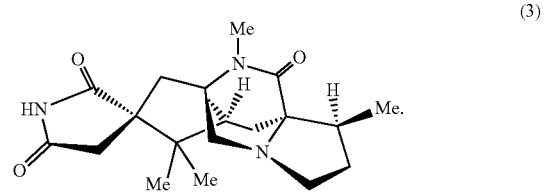

(3)

14 Claims, No Drawings

(56) References Cited

OTHER PUBLICATIONS

Rhona M. Banks, et al., "Novel Anthelmintic Metabolites from an *Aspergillus* Species; the Aspergillimides", The Journal of Antibiotics, Oct. 1997, pp. 840-846, vol. 50, No. 10.
Hideo Hayashi, et al., "Asperparaline A, a New Paralytic Alkaloid from *Aspergillus japonicus* JV-23", Tetrahedron Letters, 1997, pp. 5655-5658, vol. 38, No. 32.
Hideo Hayashi, et al., "New Paralytic Alkaloids, Asperparalines A, B and C, from *Aspergillus japonicus* JV-23", Bioscience Biotechnology and Biochemistry, 2000, pp. 111-115, vol. 64, No. 1.
Koichi Hirata, et al., "A Fungal Metabolite Asperparaline A Strongly and Selectively Blocks Insect Nicotinic Acetylcholine Receptors: The First Report on the Mode of Action", PLoS One, Apr. 2011, pp. 1-8, vol. 6, Issue 4, e18354.
International Search Report for PCT/JP2020/020955, dated Aug. 11, 2020 (PCT/ISA/210).

\* cited by examiner

PLANT PARASITIC NEMATODE CONTROL AGENT AND METHOD FOR CONTROLLING PLANT PARASITIC NEMATODE

CROSS REFERENCE TO RELATED APPLICATIONS

This application is a National Stage of International Application No. PCT/JP2020/020955 filed May 27, 2020, claiming priority based on Japanese Patent Application No. 2019-098327 filed May 27, 2019.

TECHNICAL FIELD

The present invention relates to a plant parasitic nematode control agent and a method for controlling plant parasitic nematodes, and more precisely to a control agent for plant parasitic nematodes belonging to Tylenchoidea and a method for controlling the plant parasitic nematodes.

BACKGROUND ART

Nematodes are diversely differentiated, and their ecology is also diverse. Among the nematodes, plant parasitic nematodes belonging to Tylenchoidea, such as *Meloidogyne incognita, Heterodera glycines*, and *Pratylenchus penetrans*, obtain nutrients from the roots of agricultural crop plants to proliferate, and thus are said to cause poor growth and malformation of agricultural crops, resulting in a damage cost to crop production of several billion dollars per year (Trend in Pesticide Discovery Research, CMC Publishing Co., Ltd., 2018, Chapter 7, pp. 128 to 135 (Non-Patent Document 1)). Therefore, in order to improve the yield of agricultural crops grown, it is essential to develop a control agent for these nematodes belonging to Tylenchoidea.

So far, control with fumigants and non-fumigants (contact agents) has been performed as a means for controlling plant parasitic nematodes, and restrictions on the use of existing control agents having a bad effect on the ozone layer and non-target organisms are in progress. Moreover, ineffective cases of existing agents due to the occurrence of drug resistant nematodes have been reported, and there is a demand for the development of a control agent having high human and animal safety, low environmental load, and no cross resistance with existing agents.

The PF1378A substance (16-keto-aspergillimide) has been reported as a metabolite produced by the genus *Aspergillus*, and is known as an anthelmintic active substance against third-instar larvae of *Haemonchus contortus*, a gastrointestinal parasitic nematode of mammals (The Journal of Antibiotics, 1997, 50 (10), 840-846 (Non-Patent Document 2)). In addition, it has been reported that asperparaline species containing PF1378B and C show paralytic activity against silkworms and insecticidal activity against *Spodoptera exigua, Nilaparvata lugens*, and cockroaches (Tetrahedron Letters, 1997, 38 (32), 5655-5658 (Non-Patent Document 3); Bioscience, Biotechnology and Biochemistry, 2000, (1), 111-115 (Non-Patent Document 4); Japanese Unexamined Patent Application Publication No. Hei 10-245383 (Patent Document 1); and International Publication No. WO2008/156165 (Patent Document 2)). Moreover, it has been reported that the PF1378A substance exhibits a systemic insecticidal activity against agricultural pests such as *Nilaparvata lugens* (International Publication No. WO 2010/071218 (Patent Document 3)). It is also reported that the PF1378A substance shows an insecticidal activity against animal parasitic pests such as ticks and fleas, and has safety for mammals (International Publication No. WO2010/071219 (Patent Document 4)).

Furthermore, it has been reported that asperparaline A shows a significant antagonistic activity to nicotinic acetylcholine receptors expressed in silkworm neurons in a noncompetitive manner with acetylcholine, and exhibits a high selectivity for insect receptors as compared to mammalian-derived receptors, suggesting that it has a novel mode of action as an insecticide (PLoS ONE 6 (4), e18354 (2011) (Non-Patent Document 5)). Furthermore, paraherquamide having a skeleton similar to that of asperparaline A is known as an anthelmintic agent.

CITATION LIST

Patent Literature

[PTL 1] Japanese Unexamined Patent Application
[PTL 2] International Publication No. WO2008/156165
[PTL 3] International Publication No. WO2010/071218
[PTL 4] International Publication No. WO2010/071219

Non Patent Literature

[NPL 1] Trend in Pesticide Discovery Research, CMC Publishing Co., Ltd., 2018, Chapter 7, pp. 128-135
[NPL 2] The Journal of Antibiotics, 1997, 50 (10), 840-846
[NPL 3] Tetrahedron Letters, 1997, 38 (32), 5655-5658
[NPL 4] Bioscience, Biotechnology and Biochemistry, 2000, 64 (1), 111-115
[NPL 5] PLoS ONE 6 (4), e18354 (2011)

SUMMARY OF THE INVENTION

Technical Problem

As described above, control methods against plant parasitic nematodes have been studied so far, and many nematode control agents have been developed and put on the market until now. However, it is sometimes difficult to control plant parasitic nematodes belonging to Tylenchoidea with conventional control agents, and the control agents and control methods for such nematodes have been insufficiently developed. In addition, there is still a demand for the development of a new nematode control agent with less adverse effects on non-target organisms. Furthermore, there is also a demand for a control agent that can be used labor-savingly, such as seed treatment which has a relatively low risk of exposure to the environment and requires less labor for controlling pests by users. Therefore, an object of the present invention is to provide a Tylenchoidea plant parasitic nematode control agent and a method for controlling the plant parasitic nematode, which are highly safe for non-target organisms and simple to use.

Solution to Problem

The present inventors have conducted intensive studies to achieve the above object, and have found as a result that the PF1378A substance (16-keto-aspergillimide), the PF1378B substance (asperparaline A), and the PF1378C substance (asperparaline B) show an excellent control effect against plant parasitic nematodes, especially those of Tylenchoidea, by a labor-saving treatment method such as soil treatment or seed treatment. Moreover, the present inventors have also found that a control agent containing at least one of these compounds as an active ingredient is highly safe without adversely affecting crops as non-target organisms (useful plants), and surprisingly, also has a novel action of promoting their growth particularly when the crops are dicotyledons. Thus, the present invention has been completed.

Specifically, the present invention provides the following aspects.

[1] A Tylenchoidea plant parasitic nematode control agent comprising: at least one compound selected from the group consisting of a compound represented by the following formula (1), a compound represented by the following formula (2), a compound represented by the following formula (3), enantiomers thereof, and agriculturally and horticulturally acceptable acid addition salts thereof as an active ingredient.

[Chem. 1]

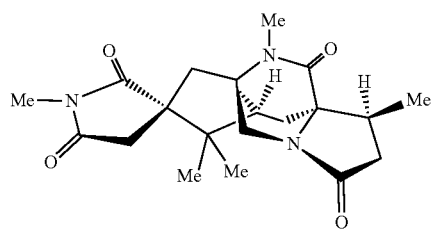

(1)

[Chem. 2]

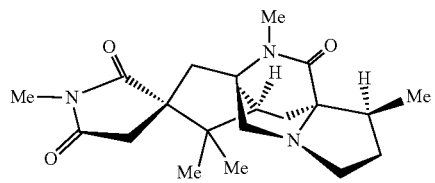

(2)

[Chem. 3]

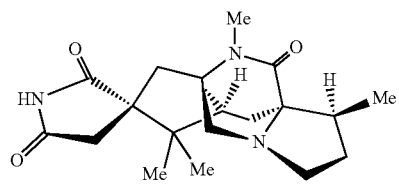

(3)

[2] The plant parasitic nematode control agent according to [1], wherein
the Tylenchoidea plant parasitic nematode is at least one plant parasitic nematode selected from the group consisting of a genus *Meloidogyne*, a genus *Heterodera*, a genus *Rotylenchulus*, and a genus *Pratylenchus*.

[3] The plant parasitic nematode control agent according to [1] or [2], further comprising: a powdery carrier, and being a dust or a powder formulation.

[4] The plant parasitic nematode control agent according to [1] or [2], further comprising: a granular or powdery carrier and a surfactant, and being a granule or a dust-granule mixture.

[5] The plant parasitic nematode control agent according to [1] or [2], further comprising: a liquid carrier, a surfactant, and a thickener, and being a flowable formulation.

[6] The plant parasitic nematode control agent according to [1] or [2], further comprising: a powdery carrier and a surfactant, and being a wettable powder.

[7] The plant parasitic nematode control agent according to any one of [1] to [6], which is also an agent for promoting growth of dicotyledons.

[8] A method for controlling a Tylenchoidea plant parasitic nematode, comprising: treating a target with an effective amount of at least one compound selected from the group consisting of a compound represented by the formula (1), a compound represented by the formula (2), a compound represented by the formula (3), enantiomers thereof, and agriculturally and horticulturally acceptable acid addition salts thereof.

[9] The method for controlling a plant parasitic nematode according to [8], wherein the Tylenchoidea plant parasitic nematode is at least one plant parasitic nematode selected from the group consisting of a genus *Meloidogyne*, a genus *Heterodera*, a genus *Rotylenchulus*, and a genus *Pratylenchus*.

[10] The method for controlling a plant parasitic nematode according to [8] or [9], wherein the target is at least one selected from the group consisting of Tylenchoidea plant parasitic nematodes, plants, soil, and culture carriers other than the soil.

[11] The method for controlling a plant parasitic nematode according to [10], wherein the target is soil or a culture carrier other than the soil, and the effective amount is 0.1 g to 1000 g per 10 are of the soil.

[12] The method for controlling a plant parasitic nematode according to [10], wherein the target is a plant seed, and the effective amount is 0.01 g to 100 g per 1 kg of the plant seed.

[13] The method for controlling a plant parasitic nematode according to any one of [8] to [12], further comprising: treating at least one target selected from the group consisting of dicotyledons, soil, and culture carriers other than the soil with the effective amount of the compound, wherein the method is also a method for promoting growth of the dicotyledons.

[14] Use of at least one compound selected from the group consisting of a compound represented by the formula (1), a compound represented by the formula (2), a compound represented by the formula (3), enantiomers thereof, and agriculturally and horticulturally acceptable acid addition salts thereof, the use being for producing a Tylenchoidea plant parasitic nematode control agent.

[15] The use according to [14], wherein the Tylenchoidea plant parasitic nematode is at least one plant parasitic nematode selected from the group consisting of a genus *Meloidogyne*, a genus *Heterodera*, a genus *Rotylenchulus*, and a genus *Pratylenchus*.

[16] The use according to [14] or [15], wherein the plant parasitic nematode control agent is also an agent for promoting growth of dicotyledons.

Advantageous Effects of Invention

The present invention makes it possible to provide a Tylenchoidea plant parasitic nematode control agent and a method for controlling the plant parasitic nematode, which are highly safe for non-target organisms and simple to use.

In addition, thanks to labor-saving treatment such as soil treatment or seed treatment, the plant parasitic nematode control agent and the method for controlling a plant parasitic nematode of the present invention exhibit an excellent control effect against Tylenchoidea plant parasitic nematodes, has high safety for non-target organisms, and also has a growth promoting effect particularly on dicotyledons. Therefore, it is possible to significantly improve the yield of agricultural crops such as cereals, beans, green grass for sugar production, vegetables, and fruit trees, particularly preferably crops such as soybean, cucumber, and radish. Additionally, it is possible to provide a control agent for Tylenchoidea plant parasitic nematodes and a method for controlling the plant parasitic nematodes, which are highly safe also in terms of the low risk of environmental exposure because the above effects are both sufficiently exhibited at low concentrations.

DESCRIPTION OF EMBODIMENTS

An aspect of the present invention provides a Tylenchoidea plant parasitic nematode control agent (which hereinafter may be simply referred to as the "nematode control agent") comprising: at least one compound selected from the group consisting of a compound represented by the following formula (1), a compound represented by the following formula (2), a compound represented by the following formula (3) (which hereinafter may be simply referred to as the "compound (1)," the "compound (2)," and the "compound (3)," respectively, and note that, in the following formulas (1) to (3), Me represents a methyl group), enantiomers thereof, and agriculturally and horticulturally acceptable acid addition salts thereof as an active ingredient.

[Chem. 4]

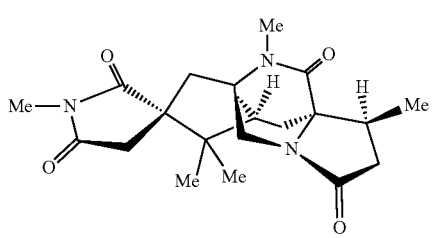

(1)

[Chem. 5]

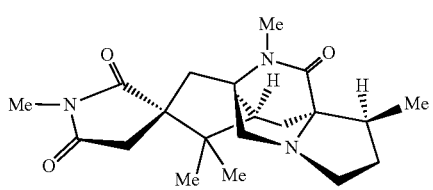

(2)

[Chem. 6]

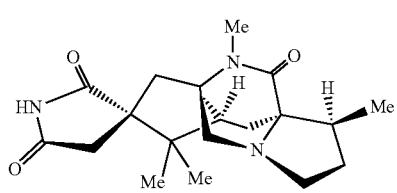

(3)

Moreover, another aspect of the present invention provides a method for controlling a Tylenchoidea plant parasitic nematode (which hereinafter may be simply referred to as the "nematode control method" or "control method"), comprising: treating a target with an effective amount of at least one compound selected from the group consisting of the compound (1), the compound (2), the compound (3), enantiomers thereof, and agriculturally and horticulturally acceptable acid addition salts thereof.

Note that, in the present invention, the "Tylenchoidea plant parasitic nematode control agent" and the "method for controlling a Tylenchoidea plant parasitic nematode" include an agent and method for killing or debilitating the Tylenchoidea plant parasitic nematodes described later, as well as an agent and method for removing Tylenchoidea plant parasitic nematodes from the plants described later, an agent and method for preventing Tylenchoidea plant parasitic nematodes from infesting plants, and an agent and method for protecting plants from Tylenchoidea plant parasitic nematodes.

Moreover, another aspect of the present invention provides a dicotyledon growth promoting agent, comprising: at least one compound selected from the group consisting of the compound (1), the compound (2), the compound (3), enantiomers thereof, and agriculturally and horticulturally acceptable acid addition salts thereof as an active ingredient. In addition, another aspect of the present invention further provides an agent for controlling plant parasitic nematodes and for promoting the growth of dicotyledons, which is also an agent for promoting the growth of dicotyledons, as the nematode control agent of the present invention.

Moreover, another aspect of the present invention provides a method for promoting growth of dicotyledons, comprising: treating at least one target selected from the group consisting of dicotyledons, soil, and culture carriers other than the soil with the effective amount of at least one compound selected from the group consisting of the compound (1), the compound (2), the compound (3), enantiomers thereof, and agriculturally and horticulturally acceptable acid addition salts thereof. In addition, another aspect of the present invention further provides a method for controlling plant parasitic nematodes and promoting the growth of dicotyledons, which is also a method for promoting the growth of dicotyledons, as the nematode control method of the present invention.

The compound (1) according to the present invention is also referred to as the "PF1378A substance (16-keto-aspergillimide)," the compound (2) is also referred to as the "PF1378B substance (asperparaline A)," and the compound (3) is also referred to as the "PF1378C substance (asperparaline B)." Each of these compounds (1) to (3) can be produced by a conventionally known method or a method analogous thereto, and can be produced from the culture of the strain producing the compound according to, for example, the method described in The Journal of Antibiotics, 1997, 50 (10), 840-846.

Further, in the present invention, not only the compounds (1) to (3) but also enantiomers thereof and a mixture of enantiomers can be used as the active ingredient.

Further, in the present invention, an agriculturally and horticulturally acceptable acid addition salt of each of the compounds (1) to (3) can be used as the active ingredient. Examples of the acid addition salt include hydrochlorides, nitrates, sulfates, phosphates, and acetates.

These compounds (active ingredients) according to the present invention, that is, the compound represented by the formula (1), the compound represented by the formula (2), the compound represented by the formula (3), enantiomers thereof, and agriculturally and horticulturally acceptable acid addition salts thereof may be used alone or in combination of two or more kinds (hereinafter, one kind or a combination of two or more kinds of these compounds may be collectively referred to simply as the "compound according to the present invention"). Among these, the compound according to the present invention is more preferably the compound represented by the formula (1) and/or the compound represented by the formula (2), and further preferably the compound represented by the formula (1).

At least one compound selected from the group consisting of a compound represented by the formula (1), a compound represented by the formula (2), a compound represented by the formula (3), enantiomers thereof, and agriculturally and horticulturally acceptable acid addition salts thereof exhibits an excellent control effect particularly against Tylenchoidea plant parasitic nematodes.

Examples of the Tylenchoidea plant parasitic nematodes include Tylenchidae, Criconematidae, Heteroderidae, Neotylenchidae, Tylenchuidae, and Allantonematidae, and Tylenchidae and Heteroderidae are preferable. Examples of the subfamilies of Tylenchidae include Pratylechinae (the genus *Rotylenchulus* and the genus *Pratylenchus*), Tylenchinae, Dolichodorinae, and Hoploaiminae. Examples of the subfamilies of Heteroderidae include Heteroderinae (the genus *Meloidogyne* and the genus *Heterodera*).

Specific examples of the genus *Meloidogyne* include *Meloidogyne*, and more specifically, *Meloidogyne incognita, Meloidogyne acronea, Meloidogyne africana, Meloidogyne arenaria, Meloidogyne arenaria thamesi, Meloidogyne artiella, Meloidogyne chitwoodi, Meloidogyne coffeicola, Meloidogyne ethiopica, Meloidogyne exigua, Meloidogyne graminicola, Meloidogyne graminis, Meloidogyne hapla, Meloidogyne incognita acrita, Meloidogyne javanica, Meloidogyne kikuyensis, Meloidogyne naasi, Meloidogyne paranaensis, Meloidogyne thamesi, Meloidogyne suginamiensis, Meloidogyne fallax, Meloidogyne enterolobii,* and *Meloidogyne mayaguensis.*

Specific examples of the genus *Heterodera* include *Heterodera,* and more specifically, *Heterodera glycines, Heterodera avenae, Heterodera cruciferae, Heterodera oryzae, Heterodera schachtii, Heterodera zeae, Globodera pallida, Globodera rostochiensis, Globodera solanacearum, Globodera tabacum, Globodera virginiae,* and *Heterodera elachista.*

Specific examples of the genus *Rotylenchulus* include *Rotylenchulus reniformis* and *Rotylenchus parrus.*

Specific examples of the genus *Pratylenchus* include *Pratylenchus penetrans, Pratylenchus alleni, Pratylenchus brachyurus, Pratylenchus coffeae, Pratylenchus crenatus, Pratylenchus dulscus, Pratylenchus fallax, Pratylenchus flakkensis, Platylenchus goodeyi, Pratylenchus hexincisus, Pratylenchus loosi, Pratylenchus minutus, Pratylenchus mulchandi, Pratylenchus musicola, Pratylenchus neglectus, Pratylenchus pratensus, Pratylenchus reniformia, Pratylenchus scibneri, Pratylenchus thornei, Pratylenchus vulnus,* and *Pratylenchus zeae.*

These Tylenchoidea plant parasitic nematodes may be used alone or in combination of two or more kinds. In particular, the compound according to the present invention exhibits a particularly excellent control activity against at least one selected from the group consisting of the genus *Meloidogyne*, the genus *Heterodera*, the genus *Rotylenchulus*, and the genus *Pratylenchus*. Among these, at least one selected from the group consisting of *Meloidogyne, Heterodera, Rotylenchulus reniformis,* and *Pratylenchus penetrans* is more preferable, and at least one selected from the group consisting of *Meloidogyne incognita, Heterodera glycines, Pratylenchus penetrans,* and *Rotylenchulus reniformis* is still more preferable.

Since the compound according to the present invention is highly safe for non-target organisms, the plant targeted by the nematode control agent and the control method of the present invention is not particularly limited, but examples thereof include useful plants such as cereals, beans, green grass for sugar production, vegetables, and fruit trees, and more specific examples include crops such as Poaceae (rice, wheat families (barley, wheat, rye), corn, sugar cane, sorghum, and Zoysia), Leguminosae (soybean, adzuki bean, kidney bean, scarlet runner bean, peanut, pulse), Brassicaceae (rapeseed, radish, cabbage, Chinese cabbage), Amaranthaceae (sugar beet), Araceae (taro, konjac potato), Malvaceae (cotton), Solanaceae (tomato, eggplant, bell pepper, capsicum, potato, tobacco), Cucurbitaceae (cucumber, melon, watermelon), Rosaceae (strawberry), Apiaceae (carrot), Convolvulaceae (sweet potato), Asteraceae (chrysanthemum, burdock), Amaryllidaceae (onion, garlic), Theaceae (tea), Rubiaceae (coffee tree), Pinaceae (pine), Vitaceae (grape), Musaceae (banana), and Rutaceae (citrus), and these may be used alone or in combination of two or more kinds.

In addition, the compound according to the present invention also exhibits a growth promoting effect particularly on dicotyledons. For this reason, the compound according to the present invention can also be used as an active ingredient of a growth promoting agent and growth promoting method for dicotyledons (including the case of also serving as a nematode control agent and a control method, the same applies hereinafter). In this case, the target plants are not particularly limited as long as they are dicotyledons, and examples thereof include crops such as Cucurbitaceae (cucumber, melon, watermelon, pumpkin), Leguminosae (soybean, adzuki bean, kidney bean, scarlet runner bean, peanut, pulse), Brassicaceae (rapeseed, radish, cabbage, Chinese cabbage), Amaranthaceae (sugar beet), Malvaceae (cotton), Solanaceae (tomato, eggplant, bell pepper, capsicum, potato, tobacco), Rosaceae (strawberry), Apiaceae (carrot), Convolvulaceae (sweet potato), Asteraceae (chrysanthemum, burdock), Amaryllidaceae, Theaceae (tea), Rubiaceae (coffee tree), Vitaceae (grape), and Rutaceae (citrus). Among these, the dicotyledons may be used alone or in combination of two or more kinds, and are preferably plants of Cucurbitaceae, Leguminosae, and Brassicaceae, in particular.

Further, in recent years, various control techniques combining microbial pesticides, genetically modified crops, and the like have been advanced, and the present invention can be combined with these techniques. Therefore, the target of the nematode control agent and control method of the present invention as well as the growth promoting agent and growth promoting method for dicotyledons may be, for example, plants that produce *Bacillus thuringiensis* (BT) toxin protein against insects to exhibit insect resistance (soybean, corn, cotton, rapeseed), plants that are resistant to the herbicides glyphosate and glufosinate (soybean, corn, cotton, rapeseed), and plants that are resistant to both insects and herbicides.

The target of the nematode control agent and the control method of the present invention is at least one of the above Tylenchoidea plant parasitic nematodes, at least one of the above plants, and at least one selected from the group consisting of soil for growing the plants and culture carriers other than the soil (nutrient solutions for hydroponic culture, sand culture, nutrient film technique (NFT), rock wool culture, and the like; and solid medium such as artificial culture soil and seedling-raising artificial mat). More specific examples of the plants include stems and leaves, seeds, roots, tubers, bulbs, and rhizomes of the plants. Among these, the target is preferably soil and/or plant seeds from the viewpoint of labor-saving treatment.

In addition, when the present invention is a dicotyledon growth promoting agent or a growth promoting agent, these targets include at least one of the above dicotyledons, and at least one selected from the group consisting of soil for growing the above dicotyledons and culture carriers other than the soil. Among these, the target is preferably soil and/or dicotyledon seeds from the viewpoint of labor-saving treatment.

The nematode control agent and the dicotyledon growth promoting agent of the present invention contain the compound according to the present invention as an active ingredient. The nematode control agent and the dicotyledon growth promoting agent of the present invention may each be at least one of the compounds according to the present invention as it is, or may be diluted. In addition, the nematode control agent and the dicotyledon growth promoting agent of the present invention may each further contain at least one of pest control agents other than the compound according to the present invention (insecticides (including acaricides and nematicides), fungicides, herbicides), plant growth regulating agents, fertilizers, and the like. Specific examples of these pesticides include those described in The Pesticide Manual (Seventeenth Edition, published by The British Crop Protection Council) and SHIBUYA INDEX (2014, published by SHIBUYA INDEX RESEARCH GROUP). In the nematode control agent and the dicotyledon growth promoting agent of the present invention, the other pest control agent is preferably an insecticide and/or fungicide.

Preferred specific examples of the other pest control agents include organic phosphate ester-based compounds, carbamate-based compounds, nereistoxin derivatives, organochlorine-based compounds, pyrethroid-based compounds, benzoylurea-based compounds, juvenile hormone-like compounds, molting hormone-like compounds, neonicotinoid-based compounds, neuronal sodium channel blockers, insecticidal macrocyclic lactones, γ-aminobutyric acid (GABA) antagonists, ryanodine receptor-acting compounds, insecticidal ureas, BT agents, insect pathogenic virus agents, polyether-based antibiotics, thiamine antagonists, and sulfa/folate antagonist combination agents.

More specific examples of the insecticides include organic phosphate ester-based compounds such as acephate, dichlorvos, EPN, fenitrothion, fenamifos, prothiofos, profenofos, pyraclofos, chlorpyrifosmethyl, diazinon, fosthiazate, and imicyafos; carbamate-based compounds such as methomyl, thiodicarb, aldicarb, oxamyl, propoxur, carbaryl, fenobucarb, ethiofencarb, fenothiocarb, pirimicarb, carbofuran, carbosulfan, and benfuracarb; nereistoxin derivatives such as cartap and thiocyclam; organochlorine-based compounds such as dicofol and tetradifon; pyrethroid-based compounds such as permethrin, tefluthrin, cypermethrin, deltamethrin, cyhalothrin, fenvalerate, fluvalinate, ethofenprox, silafluofen, and cyhalothrin; benzoylurea-based compounds such as diflubenzuron, teflubenzuron, flufenoxuron, and chlorfluazuron; juvenile hormone-like compounds such as methoprene; molting hormone-like compounds such as chromafenozide; nicotinic acetylcholine receptor agonists such as imidacloprid, clothianidin, thiamethoxam, acetamiprid, nitenpyram, thiacloprid, dinotefuran, sulfoxaflor, flupyradifurone, dicloromezotiaz, and triflumezopyrim; diamide compounds such as flubendiamide, chlorantraniliprole, cyantraniliprole, cyclaniliprole, and tetraniliprole; GABA receptor-acting compounds such as ethiprole, fipronil, pyrafluprole, pyriprole, broflanilide, and fluxametamide; respiratory chain electron transport system complex I inhibitor compounds such as pyridaben, fenpyroximate, pyrimidifen, tebufenpyrad, and tolfenpyrad; respiratory chain electron transport system complex II inhibitor compounds such as fluopyram, cyflumetofen, cyenopyrafen, and pyflbumide; respiratory chain electron transport system complex III inhibitor compounds such as fluacrypyrim, acequinocyl, and flometoquin; ACCase inhibitor compounds such as spirodiclofen, spiromesifen, and spirotetramat, and macrolide compounds such as spinosad, avermectin, milbemycin, spinetoram, lepimectin, and emamectin benzoate.

Moreover, examples of other compounds include buprofezin, hexythiazox, amitraz, chlordimeform, ethoxazole, pymetrozine, bifenazate, flonicamid, chlorfenapyr, pyriproxyfen, indoxacarb, pyridalyl, pyrifluquinazon, metaflumizone, hydramethylnon, triazamate, afidopyropen, flupyrimin, renofluthrin, chloroprallethrin, cyhalodiamide, fluensulfone, fluazaindolizine, epsilon-metofluthrin, psilonmomfluorothrin, kappa-bifenthrin, kappa-tefluthrin, fluhexafon, tioxazafen, momfluorothrin, heptafluthrin, pyriminostrobin, cycloxaprid, isocycloseram, oxazosulfyl, tyclopyrazoflor, spiropidion, acynonapyr, benzpyrimoxan, dimpropyridaz, flupentiofenox, cyetpyrafen, organometallic compounds, dinitro-based compounds, organic sulfur compounds, urea-based compounds, triazine-based compounds, and hydrazine-based compounds, and examples also include microbial pesticides such as BT agents and insect pathogenic virus agents.

Among these, the insecticides may be used alone or in combination of two or more kinds, and are preferably flupyrimin. Each of these insecticides may be an agriculturally and horticulturally acceptable acid addition salt thereof.

In addition, more specifically, examples of the fungicide include strobilurin-based compounds such as azoxystrobin, kresoxym-methyl, trifloxystrobin, metominostrobin, orysastrobin, and pyraclostrobin; anilinopyrimidine-based compounds such as mepanipyrim, pyrimethanil, and cyprodinil; azole-based compounds such as triadimefon, bitertanol, triflumizole, metoconazole, propiconazole, penconazole, flusilazole, myclobutanil, cyproconazole, terbuconazole, hexaconazole, prochloraz, simeconazole, and prothioconazole; quinoxaline-based compounds such as quinomethionate; dithiocarbamate-based compounds such as maneb, zineb, mancozeb, polycarbamate, and propineb; phenylcarbamate-based compounds such as diethofencarb; organochlorine-based compounds such as chlorothalonil and quintozene; benzimidazole-based compounds such as benomyl, thiophanate-methyl, and carbendazole; phenylamide-based compounds such as metalaxyl, oxadixyl, ofurace, benalaxyl, furalaxyl, and cyprofuram; Sulfenic acid-based compounds such as dichlofluanid; copper-based compounds such as copper hydroxide and oxine-copper; isoxazole-based compounds such as hydroxyisoxazole; organophosphorus-based compounds such as fosetyl-aluminium and tolclofos-methyl; N-halogenothioalkyl-based compounds such as captan, captafol, and folpet; dicarboximide-based compounds such as procymidone, iprodione, and vinclozolin; carboxanilide-based compounds such as flutolanil, mepronil, furametpyr, thifluzamide, boscalid, and penthiopyrad; morpholine-based compounds such as fenpropimorph and dimethomorph; organotin-based compounds such as fentin hydroxide and fentin acetate; and cyanopyrrole-based compounds such as fludioxonil and fenpiclonil.

Furthermore, examples of other compounds include tricyclazole, pyroquilon, carpropamid, diclocymet, fenoxanil, fthalide, fluazinam, cymoxanil, triforine, pyrifenox, fenarimol, fenpropidin, pencycuron, ferimzone, cyazofamid, iprovalicarb, benthiavalicarb-isopropyl, iminoctadin-albesilate, cyflufenamid, kasugamycin, validamycin, streptomycin, oxolinic acid, tebufloquin, probenazole, tiadinil, isotianil, isoprothiolane, tolprocarb, pydiflumetofen, picarbutrazox, mandestrobin, dipymetitrone, pyrazifilumid, oxathiapiprolin, penflufen, fenpicoxamid, fluxapyroxad, isoflucypram, metyltetraprole, pyrapropoyne, pyridachlomethyl, ipflufenoquin, fluopimomide, fluindapyr, florylpicoxamid, and dichlobentiazox.

Among these, also, the fungicides may be used alone or in combination of two or more kinds. In addition, each of these fungicides may be an agriculturally and horticulturally acceptable acid addition salt thereof.

In addition, the nematode control agent and the dicotyledon growth promoting agent of the present invention are preferably used by being formulated into suitable shapes for use.

Another aspect of the present invention provides an aspect which further contains a suitable agriculturally and horticulturally acceptable carrier, as the nematode control agent and/or dicotyledon growth promoting agent of the present invention. The form thereof can be formulated into any dosage forms such as emulsifiable concentrates, soluble concentrates, water soluble powders, emulsions, wettable powders, water dispersible granules, flowable formulations, suspoemulsions, dusts formulations, less-drifting(DL) dusts formulations, powder formulations, granules, dust-granule mixtures, tablets, oil solutions, aerosols, smoking agents, and microcapsules. These various dosage forms can be produced by, for example, the method described in "Nouyaku Seizai Guide" (edited by Japan Agricultural Formulation and Application Group, and published by Japan Plant Protection Association, 1997).

The agriculturally and horticulturally acceptable carrier can be appropriately selected from solid carriers, liquid carriers, gaseous carriers, and the like depending on the above dosage form.

Depending on the particle diameter, the solid carrier can be roughly classified into a powdery form (average particle diameter of less than 63 µm) and a granular form (average particle diameter of 63 µm or more), and can be appropriately selected according to the dosage form. Examples of the powdery carrier include talc, bentonite, clay, kaolin, diatomaceous earth, white carbon (silicon dioxide, calcium silicate), calcium carbonate, ammonium sulfate, potassium sulfate, calcium sulfate, plant-based powder such as wood flour, starch, and dextrin. Examples of the granular solid carrier include vermiculite, silica sand, pumice, perlite, diatomaceous earth grains, attapulgite grains, zeolite grains, bentonite grains, wood chips and corks, and plant-based granular materials matter such as corn cobs. Alternatively, the granular solid carrier used may be a clay granulated product or calcium carbonate granulated product obtained by granulating and molding a powdery carrier such as clay or calcium carbonate added with a binder or the like. Among these, the solid carrier may be used alone or in combination of two or more kinds. In particular, talc, bentonite, clay, kaolin, diatomaceous earth, white carbon (silicon dioxide, calcium silicate), silica sand, calcium sulfate, and clay granulated product are preferable.

Examples of the liquid carrier include alcohols such as ethanol, n-hexanol, polyethylene glycol, and propylene glycol; ketones such as γ-butyrolactone and cyclohexanone; aliphatic hydrocarbons such as n-hexane, normal paraffin, liquid paraffin, and naphthene; aromatic hydrocarbons such as xylene, alkylbenzene, and methylnaphthalene; ethers such as diethyl ether, dioxane, and tetrahydrofuran; esters such as fatty acid methyl ester and ethyl acetate; nitriles such as acetonitrile and isobutyronitrile; acid amides such as dimethylformamide and dimethylacetamide; vegetable oils such as soybean oil and cottonseed oil; dimethyl sulfoxide; N-alkylpyrrolidone; and water, and these may be used alone or in combination of two or more kinds. In particular, propylene glycol, liquid paraffin, and water are preferable.

In addition, examples of the gaseous carrier include LPG, air, nitrogen, carbon dioxide gas, and dimethyl ether, and these may be used alone or in combination of two or more kinds.

In addition to the carrier, each of the nematode control agent and the dicotyledon growth promoting agent of the present invention may optionally further contain, as a formulation aid, at least one selected from the group consisting of surfactants which has a function of emulsification, dispersion, wetting, or the like; thickeners; binders; colorants; antifoams; antifreeze agents; antifungal agents; flowability improvers; adhesive agents; and solvents, each of.

Examples of the surfactants include surfactants such as anionic, nonionic, cationic, and amphoteric surfactants.

Examples of the anionic surfactants include POA (POA: polyoxyalkylene) alkyl phenyl ether sulfate, POA styryl phenyl ether sulfate, polyoxyethylene polyoxypropylene block polymer sulfate, sodium lauryl sulfate, sodium alkane sulfonate, α-olefin sulfonate, dialkyl sulfosuccinate, alkylbenzene sulfonate, naphthalene sulfonic acid formalin condensate salt (such as sodium salt), lignin sulfonate (such as sodium salt), POA alkyl phenyl ether sulfonate, fatty acid salt, POA alkyl phenyl ether phosphate, POA styryl phenyl ether phosphate, and polycarboxylic acid type surfactant. Note that POA represents one of polyoxyethylene and polyoxypropylene or a mixture thereof. The anionic surfactants may be used alone or in combination of two or more kinds. Among them, lauryl sulfate (more preferably sodium salt), alkylbenzene sulfonate (more preferably sodium salt), and lignin sulfonate (more preferably sodium salt) are preferable.

Examples of the nonionic surfactants include POA styryl phenyl ether, POA sorbitan fatty acid ester, sorbitan fatty acid ester, sucrose fatty acid ester, POA castor oil, POA hydrogenated castor oil, POA alkyl ether, POA alkyl phenyl ether, polyoxyethylene polyoxypropylene block polymer, POA alkylamine, silicone-based surfactant, and acetylene glycol-based surfactant, and these may be used alone or in combination of two or more kinds. Note that POA represents one of polyoxyethylene and polyoxypropylene or a mixture thereof.

Examples of the cationic surfactants include alkyl trimethylammonium chloride, methyl polyoxy alkylene alkyl ammonium chloride, and alkyl dimethyl benzalkonium chloride, and these may be used alone or in combination of two or more kinds.

Examples of the amphoteric surfactants include dialkyl diaminoethyl betaine and alkyl dimethylbenzyl betaine, and these may be used alone or in combination of two or more kinds.

Regarding the thickeners, examples of organic thickeners include , but are not limited to, xanthan gum, welan gum, diutan gum, guar gum, tragacanth gum, gum arabic, dextrin, carboxymethyl cellulose, polyvinyl alcohol, and water-soluble cellulose ether, and examples of inorganic thickeners include , but are not limited to, montmorillonite-based mineral fine powder, saponite-based clay mineral, and anhydrous silica fine powder. These may be used alone or in combination of two or more kinds.

Examples of the binders include , but are not limited to, polyvinyl alcohol, water-soluble cellulose ethers such as carboxymethyl cellulose, starch, dextrin, and bentonite. These may be used alone or in combination of two or more kinds. Further, a liquid carrier, a solid carrier, or a surfactant may also function as a binder depending on the dosage form and production method, and thus a binder may not be added specially.

Examples of the colorants include inorganic pigments such as iron oxide and titanium oxide; organic pigments such as alizarin dye, azo dye, and metal phthalocyanine dye; and food dyes such as Red No. 2, Red No. 3, Red No. 40, Red No. 102, Red No. 104, Red No. 105, Red No. 106, Yellow No. 4, Yellow No. 5, Green No. 3, Blue No. 1, or Blue No. 2. These may be used alone or in combination of two or more kinds.

Examples of the antifoams include oil-based, metal soap-based, and silicone-based ones, and these may be used alone or in combination of two or more kinds.

Examples of the antifreeze agents include alkylene glycol-based ones such as ethylene glycol and propylene glycol, glycerin, and urea, and these may be used alone or in combination of two or more kinds.

Examples of the antifungal agents include, but are not limited to, potassium sorbate, p-chloro-meta-xylenol and butyl p-oxybenzoate, p-hydroxybenzoic acid ester, salicylic acid derivatives, and 1,2-benzothiazolin-3-one derivatives. In addition, these may be used alone or in combination of two or more kinds.

Examples of the flowabitity improvers include, but are not limited to, white carbon (silicon dioxide, calcium silicate) and highly viscous liquids such as liquid paraffin.

Examples of the adhesive agents include, but are not limited to, water-soluble polymers such as polyethylene glycol and polyvinyl alcohol, and synthetic resin emulsions such as vinyl acetate and acrylate, and these may be used alone or in combination of two or more kinds. Further, the liquid carrier, solid carrier, surfactant, binder, or the like may also function as an adhesive agent depending on the dosage form, and thus an adhesive agent may not be added specially.

The formulation aid is not limited to the formulation aids shown here, and various types of aids can be used as long as they can achieve the object of the present invention.

The above-mentioned formulation aids such as carriers and surfactants may be used alone or in combination as necessary.

In the nematode control agent and the dicotyledon growth promoting agent of the present invention, the content of the compound (active ingredient) according to the present invention (when there are two or more kinds of compounds according to the present invention, the total amount thereof, and the same applies hereinafter) is 0.1 to 99.9% by weight, preferably 0.1 to 80% by weight, and more preferably 0.2 to 80% by weight, although it is not particularly limited as it depends on the purpose of use and treatment method. When the nematode control agent and/or dicotyledon growth promoting agent of the present invention further contains the above-mentioned other pest control agent, the mixing ratio of the compound according to the present invention and the other pest control agent can be appropriately changed over a wide range.

In addition, when the nematode control agent and/or dicotyledon growth promoting agent of the present invention further contains the above-mentioned agriculturally and horticulturally acceptable carrier, the mixing ratio of the compound according to the present invention and the carrier can be appropriately changed over a wide range, but the composition in a preferred embodiment includes the following.

(1) A composition which is a wettable powder containing 0.6 to 30% by weight of a humectant and/or a dispersant (preferably a surfactant) and 20 to 95% by weight of a powdery carrier, (1') composition which is a wettable powder containing 10 to 70% by weight of the compound according to the present invention, 0.6 to 20% by weight of a humectant and/or a dispersant (preferably a surfactant), and 10 to 89.4% by weight of a powdery carrier, (2) a composition which is a water dispersible granule containing a humectant and/or a dispersant (preferably a surfactant) and a binder in a total amount of 0.6 to 30% by weight and a powdery carrier in an amount of 20 to 95% by weight, (2') a composition which is a water dispersible granule containing the compound according to the present invention in an amount of 0.2 to 50% by weight, a humectant and/or a dispersant (preferably a surfactant) and a binder in a total amount of 0.6 to 30% by weight, and a powdery carrier in an amount of 20 to 99.2% by weight, (3) a composition which is a flowable formulation containing 5 to 40% by weight of at least one formulation aid selected from humectants and/or dispersants (preferably surfactants), thickeners, antifreeze agents, antifungal agents, and antifoams, and 20 to 94% by weight of water as a liquid carrier, (3') a composition which is a flowable formulation containing 10 to 70% by weight of the compound according to the present invention, 5 to 28% by weight of at least one formulation aid selected from humectants and/or dispersants (preferably surfactants), thickeners, antifungal agents, antifreeze agents, antifoams, and adhesive agents, and 2 to 85% by weight of water as a liquid carrier, (4) a composition which is an emulsifiable concentrate containing 1 to 30% by weight of an emulsifier (preferably a surfactant) and 20 to 97% by weight of an organic solvent as a liquid carrier, (4') a composition which is an emulsifiable concentrate containing 10 to 70% by weight of the compound according to the present invention, 1 to 25% by weight of an emulsifier (preferably a surfactant), and 5 to 89% by weight of an organic solvent as a liquid carrier, (5) a composition which is a dust containing 70 to 99.8% by weight of a powdery carrier, (5') a composition which is a dust or a powder formulation containing 10 to 80% by weight of the compound according to the present invention and 10 to 90% by weight of a powdery carrier, (6) a composition which is a dust-granule mixture containing 0.2 to 10% by weight of a solvent or a binder and 70 to 99.6% by weight of a granular solid carrier, (6') a composition which is a dust-granule mixture containing 0.1 to 20% by weight of the compound according to the present invention, 0.2 to 10% by weight of a solvent or a binder, and 70 to 99.7% by weight of a granular solid carrier, (7) a composition which is an extruded granule containing a wetting agent and/or a dispersant (preferably a surfactant) and a binder in a total amount of 0.5 to 30% by weight and a powdery carrier in an amount of 20 to 98% by weight, (7') a composition which is an extruded granule containing the compound according to the present invention in an amount of 0.1 to 20% by weight, a humectant and/or a dispersant (preferably a surfactant) and a binder in a total amount of 0.5 to 30% by weight, and a powdered solid carrier in an amount of 50 to 99.4% by weight, (8) a composition which is a coated granule containing a humectant and/or a dispersant (preferably a surfactant), a powdery carrier, and a binder in a total amount of 0.5 to 30% by weight, and a granular solid carrier in an amount of 20 to 98% by weight, (8') a composition which is a coated granule containing the compound according to the present invention in an amount of 0.1 to 20% by weight, a humectant and/or a dispersant (preferably a surfactant), a powdery carrier, and a binder in a total amount of 0.5 to 30% by weight, and a granular solid carrier in an amount of 50 to 99.4% by weight, (9) a composition which is a microcapsule containing a membrane material, an emulsifier, a dispersant (preferably a surfactant), and an antifungal agent in a total amount of 1 to 50% by weight, and water as a liquid carrier in an amount of 20 to 98% by weight, and (9') a composition which is a microcapsule containing a membrane material, the compound according to the present invention in an amount of 0.1 to 20% by weight, an emulsifier, a dispersant (preferably a surfactant), and an antifungal agent in a total amount of 1 to 50% by weight, and water as a liquid carrier in an amount of 30 to 98.9% by weight.

Among them, the compositions (1'), (3'), (5'), (6'), (7'), and (8') are more preferable as compositions further containing agriculturally and horticulturally acceptable carriers.

In addition, the nematode control agent and the dicotyledon growth promoting agent of the present invention may each be a seed treatment agent for treating the plant seed described above.

Additionally, another aspect of the present invention provides a combination of the nematode control agent and/or dicotyledon growth promoting agent of the present invention, which contains the compound according to the present invention, with a control agent containing at least one of the other pest control agents. These may be used alone to prepare the formulation of each agent, and when used, they may be mixed in situ.

According to another preferred embodiment of the present invention, in the above combination, the agent containing the compound according to the present invention is provided as a first composition, and the agent containing the other pest control agent is provided as a second composition. In this case, as in the case of the above-mentioned nematode control agent and dicotyledon growth promoting agent of the present invention, the first composition and the second composition can be in any dosage form with a suitable carrier and/or formulation aid. The combination may be provided in the form of a pesticide set or the like.

As the nematode control method and/or dicotyledon growth promoting method of the present invention, still another aspect of the present invention provides a method including applying the compound according to the present invention or a first composition containing the same, and at least one of the other pest control agents or the second composition containing the same to the treatment target area simultaneously or separately (preferably the components simultaneously).

In this method, applying "simultaneously" also includes mixing both of the compound according to the present invention or the first composition, and at least one of the other pest control agents or the second composition before applying them to the treatment target area, and then applying the mixture. Applying "separately" includes applying the compound according to the present invention or the first composition prior to at least one of the other pest control agents or the second composition, or applying the former posterior to the latter, without premixing them.

Yet another preferred embodiment of the present invention provides a method for controlling a Tylenchoidea plant parasitic nematode and/or a method for promoting growth of a dicotyledon, including applying the first composition containing the compound according to the present invention as an active ingredient, and the second composition containing at least one of the other pest control agents as an active ingredient to the treatment target area.

As the plant parasitic nematode control method and/or dicotyledon growth promoting method, another aspect of the present invention provides a method for controlling a Tylenchoidea plant parasitic nematode, in which an effective amount of the compound according to the present invention, the nematode control agent of the present invention, the dicotyledon growth promoting agent of the present invention, or the combination is untreated or diluted to treat the target, preferably the plant seeds or soil.

In addition, another aspect of the present invention provides use of the compound according to the present invention, the nematode control agent of the present invention, the dicotyledon growth promoting agent of the present invention, or the combination, for controlling Tylenchoidea plant parasitic nematodes (preferably for protecting the plant from the Tylenchoidea plant parasitic nematodes) and/or for promoting the growth of dicotyledons.

In the present invention, the method for treating the target with the compound according to the present invention, the nematode control agent of the present invention, the dicotyledon growth promoting agent of the present invention, or the combination preferably includes seed treatment and soil treatment.

Examples of the seed treatment include a dipping method, a dressing method, a smearing method, a spraying method, a pellet method, a coating method, and a fumigation method.

The dipping method is a method in which seeds are dipped in a liquid pesticide (the compound according to the present invention, the nematode control agent of the present invention, the dicotyledon growth promoting agent of the present invention, or the combination, hereinafter the same), and the dressing method includes a dry dressing method which attaches a powdery pesticide to dry seeds and a wet dressing method which soaks seeds lightly in water and coats them with a powdery pesticide.

In the smearing method, a small amount of water and an optional dye are added to a predetermined amount of a wettable powder of a pesticide, and the mixture is stirred on a stirrer for several tens of seconds, whereby uniform crop seeds covered with a control agent can be obtained. In addition, the spraying method is a method for spraying a pesticide onto the seed surface.

Furthermore, when pelletizing seeds with filler to a certain size and shape, there are the pellet method in which filler is mixed with a pesticide for treatment, the coating method in which a pesticide-containing film is coated on seeds, and the fumigation method in which seeds are disinfected by a pesticide gasified in a closed container. Moreover, the method for spraying a pesticide directly to the soil and sees in a seeding furrow at the time of sowing is also mentioned.

Plus, the compound according to the present invention, the nematode control agent of the present invention, the dicotyledon growth promoting agent of the present invention, or the combination can also be applied to germinated plants and young plants to be transplanted after germination or after emergence from soil, in addition to the seeds. All or partial treatment by dipping can protect these plants prior to transplantation.

The soil treatment is not particularly limited, but preferably applying the compound according to the present invention, the nematode control agent of the present invention, the dicotyledon growth promoting agent of the present invention, or the combination into or onto the soil. Examples of such soil treatment include treatment methods such as admixture treatment, spraying treatment, and belt, furrow, and planting hole applying treatment (including in-furrow soil spraying treatment and in-furrow treatment), and examples of preferred treatment methods include admixture treatment, spraying treatment, and furrow and planting hole applying treatment. For example, in the admixture treatment, a granular pesticide is manually and mechanically admixed in a soil at 15 to 25 cm from the surface layer, making it possible to control Tylenchoidea plant parasitic nematodes during plant cultivation. Also, at the time of sowing and planting of seed potatoes, a pesticide is spray-treated to both the plant body and the soil in the furrow of the soil surface layer, making it possible to control Tylenchoidea plant parasitic nematodes. Furthermore, applying the pesticide by irrigating the soil is also a preferred soil treatment method.

In addition to these, examples of preferred target treatment methods include hydroponic culture and sand culture for the production of vegetables and flowers, nutrient film technique (NFT), addition of a pesticide to a nutrient solution in a nutrient solution cultivation system exemplified by solid medium cultivation such as rock wool cultivation, and application of a pesticide to a nursery box for raising rice seedlings (mixing with nursery bed soil). There is also a method for directly applying a pesticide to an artificial culture soil containing vermiculite and a solid medium containing a seedling-raising artificial mat.

When the target is a plant and its stems and leaves are subjected to spraying treatment, or when the target is a Tylenchoidea plant parasitic nematode that is parasitic on the plant, the amount treated of the compound according to the present invention (that is, effective amount: when two or more kinds of compounds according to the present invention are used, the total amount thereof, the same applies hereinafter) is preferably 0.1 g to 10 kg, and more preferably 1 g to 1000 g, per 10 are of cultivated land.

When the target is a plant seed, the amount (effective amount) treated of the compound according to the present invention is not particularly limited, but is preferably 0.01 to 100 g, more preferably 0.01 to 20 g, further preferably 0.1 g to 20 g, and still more preferably 0.2 g to 15 g, per 1 kg of seeds. Here, in this case, the effective amount to be attached to the seeds (effective amount of the compound of the present invention existing in the coating) is in the range of 0.002 to 10 mg/seed, and preferably 0.1 mg to 5.0 mg/seed.

When the target is soil or a culture carrier other than the soil (nutrient solutions for hydroponic culture, sand culture, nutrient film technique (NFT), rock wool culture, and the like; and solid medium such as artificial culture soil and seedling-raising artificial mat), the amount (effective amount) treated of the compound according to the present invention is not particularly limited, but is preferably 0.1 g to 1000 g, and preferably 1 g to 100 g, per 10 are of soil.

EXAMPLES

Hereinafter, the present invention is specifically described with reference to formulation examples and test examples as Examples, but the present invention is not limited to these Examples.

| Formulation Example 1 [Dust and/or Powder Formulation] | |
| --- | --- |
| Compound of formula (1) | 50% by weight |
| Clay | 34% by weight |
| White carbon | 5% by weight |
| Calcium sulfate | 11% by weight |

The above components were uniformly mixed and pulverized to obtain a dressing dust.

| Formulation Example 2 [Dust and/or Powder Formulation] | |
| --- | --- |
| Compound of formula (2) | 50% by weight |
| Clay | 34% by weight |
| White carbon | 5% by weight |
| Calcium sulfate | 11% by weight |

The above components were uniformly mixed and pulverized to obtain a dressing dust.

| Formulation Example 3 [Wettable Powder] | |
| --- | --- |
| Compound of formula (1) | 30% by weight |
| Clay | 60% by weight |
| White carbon | 4% by weight |
| Sodium alkylbenzene sulfonate | 2% by weight |
| Sodium naphthalene sulfonate formaldehyde condensate | 4% by weight |

The above components were uniformly mixed and pulverized to obtain a wettable powder.

| Formulation Example 4 [Flowable Formulation] | |
| --- | --- |
| Compound of formula (1) | 50.0% by weight |
| Polyoxyethylene styryl phenyl ether | 5.0% by weight |
| Sodium lauryl sulfate | 2.0% by weight |
| Propylene Glycol | 10.0% by weight |
| Xanthan gum | 0.3% by weight |
| 1,2-benzothiazolin-3-one | 0.05% by weight |
| Silicone-based antifoam | 0.2% by weight |
| Dye | 3.0% by weight |
| Water | 29.45% by weight |

The total amount after removing xanthan gum, 1,2-benzothiazolin-3-one, and an appropriate amount of water from the above composition was premixed, and the mixture was pulverized with a wet pulverizer. Then, xanthan gum, 1,2-benzothiazolin-3-one, and the remaining water were added to obtain a flowable formulation.

| Formulation Example 5 [Granule, Coated Granule] | |
| --- | --- |
| Compound of formula (1) | 2.0% by weight |
| Silica sand | 85.1% by weight |
| Sodium lauryl sulfate | 0.5% by weight |
| Sodium lignosulfonate | 0.5% by weight |
| White carbon | 0.5% by weight |
| Liquid paraffin | 1.2% by weight |
| Dye | 0.2% by weight |
| Kaolin | 10.0% by weight |

Among the above components, the compound of formula (1), sodium lauryl sulfate, sodium lignosulfonate, white carbon, dye, and kaolin were uniformly mixed and pulverized to obtain a pulverized product. Liquid paraffin was added to the silica sand to uniformly wet it, and then the pulverized product was uniformly mixed and coated with the silica sand to obtain granules.

(Test Example 1) *Meloidogyne incognita* Control Test (in vitro)

Each well of a 24-well plate was charged with 1 mL of a chemical solution prepared to have a final concentration of 0.1% acetone and a predetermined concentration of the compound (1) or compound (2), in which 20 to 30 larvae of *Meloidogyne incognita* at the second stage were released and left to stand in the dark at 25° C. The number of surviving and moribund worms 2 days after the addition of the chemical solution was measured, and the moribund-mortal worm rate was calculated by the following formula.

Calculation Formula for Moribund-Mortal Worm Rate

Moribund-mortal worm rate=(number of mortal worms+number of moribund worms)/(total number of worms)×100

As a result, both of the compound (1) and the compound (2) showed a moribund-mortal worm rate of 90% or more at a concentration of 10 ppm.

(Test Example 2) *Heterodera glycines* Control Test (in vitro)

Each well of a 24-well plate was charged with 1 mL of a chemical solution prepared to have a final concentration of 0.1% acetone and a predetermined concentration of the compound (1), in which 20 to 30 larvae of *Heterodera glycines* at the second stage were released and left to stand in the dark at 25° C. The number of surviving and moribund worms 2 days after the addition of the chemical solution was measured. In addition, the number of surviving and moribund worms in the untreated group not treating the compound (1) was measured in the same manner, and the corrected mortal worm rate was calculated by the following formula.

Calculation Formula for Corrected Mortal Worm Rate

Corrected mortal worm rate (%)={(mortal worm rate of treated group−mortal worm rate of untreated group)/(100−mortal worm rate of untreated group)}×100

As a result, the compound (1) showed a corrected mortal worm rate of 100% at a concentration of 10 ppm.

(Test Example 3) *Meloidogyne incognita* Control Test (Soil Irrigation)

Cucumber seeds were sown one by one in a 3 cm styrene cup filled with sterilized soil. After germination, 3 mL each of a chemical solution prepared with 10% acetone water was irrigated into the soil so that the compound (1) would be 100 ppm when irrigated into the soil. After 1 hour, 200 counts/mL of the second stage larval solution of *Meloidogyne incognita* were inoculated at 1 mL/pot. Then, 21 days after the inoculation, the degree of gall formation on the cucumber root was classified by a visual inspection based on the following 6-level gall formation degree criteria, and the gall index was calculated. In addition, the gall index, in the case of the treated group not treating the compound (1) (untreated), was also calculated in the same manner. Table 1 below presents the results.

Calculation Formula for Gall Index

Gall index=(0×a+1×b+2×c+3×d+4×e+5×f)/((a+b+c+d+e+f)×5)×100 a: number of strains that meet the gall formation degree criteria of 0, b: number of strains that meet the gall formation degree criteria of 1, c: number of strains that meet the gall formation degree criteria of 2, d: number of strains that meet the gall formation degree criteria of 3, e: number of strains that meet the gall formation degree criteria of 4, and f: number of strains that meet the gall formation degree criteria of 5.

Gall Formation Degree Criteria

0 . . . no galls are observed
1 . . . slightly observed, but the damage is unnoticeable
2 . . . observed, but few large galls
3 . . . many galls are observed, including large and small ones
4 . . . many large galls are observed (50% or less) the root is thickened due to large galls (50% or more)

TABLE 1

| Treatment Group | Gall Index |
| --- | --- |
| Untreated | 76 |
| Compound (1) | 0 |

(Test Example 4) Cucumber Phytotoxicity Test (Seed Dressing)

Cucumber seeds were sown one by one in a 3 cm styrene cup filled with sterilized soil, where the seeds had been subjected to dressing treatment with a dressing dust presented in Formulation Example 1 or Formulation Example 2 so that the amount treated of the compound (1) or compound (2) would be a predetermined amount.

The germination rate was calculated 10 days after sowing. In addition, the germination rate was also calculated in the same manner for the case of sowing seeds treated with fluensulfone instead of Formulation Example 1 (compound (1)) or Formulation Example 2 (compound (2)) and for the case of sowing seeds treated with none of the compounds. Table 2 below presents the results.

TABLE 2

| Treatment Group | Amount of Active Ingredient Treated [mg/seed] | Sowing Count | Germination Count | Germination Rate [%] |
| --- | --- | --- | --- | --- |
| Untreated | — | 5 | 5 | 100 |
| Compound (1) | 0.5 | 5 | 5 | 100 |
| Compound (2) | 0.5 | 5 | 5 | 100 |
| Fluensulfone | 0.5 | 5 | 0 | 0 |

(Test Example 5) *Meloidogyne incognita* Control Test 1 (Seed Dressing)

Cucumber seeds were sown one by one in a 3 cm styrene cup filled with sterilized soil, where the seeds had been subjected to dressing treatment with a dressing dust presented in Formulation Example 1 so that the amount treated of the compound (1) would be a predetermined amount. Then, 10 days after sowing, 200 counts/mL of the second stage larval solution of Meloidogyne incognita was inoculated at 1 mL for each seed. Then, 21 days after the inoculation, the degree of gall formation on the cucumber root was classified by a visual inspection based on the following 6-level gall formation degree criteria, and the gall index was calculated. In addition, the gall index was also calculated in the same manner for the case of sowing seeds treated with paraherquamide A instead of Formulation Example 1 (compound (1)) and for the case of sowing seeds treated with none of the compounds. Table 3 below presents the results.

Calculation Formula for Gall Index

Gall index=(0×a+1×b+2×c+3×d+4×e+5×f)/((a+b+c+d+e+f) ×5)×100 a: number of strains that meet the gall formation degree criteria of 0, b: number of strains that meet the gall formation degree criteria of 1, c: number of strains that meet the gall formation degree criteria of 2, d: number of strains that meet the gall formation degree criteria of 3, e: number of strains that meet the gall formation degree criteria of 4, and f: number of strains that meet the gall formation degree criteria of 5.

Gall Formation Degree Criteria

0 . . . no galls are observed
1 . . . slightly observed, but the damage is unnoticeable
2 . . . observed, but few large galls
3 . . . many galls are observed, including large and small ones
4 . . . many large galls are observed (50% or less) the root is thickened due to large galls (50% or more)

TABLE 3

| Treatment Group | Amount of Active Ingredient Treated [mg/seed] | Gall Index |
| --- | --- | --- |
| Untreated | — | 100 |
| Compound (1) | 0.5 | 8 |
| Paraherquamide A | 0.5 | 44 |

(Test Example 6) *Rotylenchulus reniformis* Control Test (Seed Dressing)

To the dressing dust presented in Formulation Example 1, genetically modified soybean seeds, a small amount of water, and a blue dye were added, and the mixture was stirred on a stirrer for several tens of seconds, thereby obtaining genetically modified soybean seeds uniformly smeared with this dust. These soybean seeds were sown in the soil previously inoculated with the eggs and larvae of Rotylenchulus reniformis. Then, days after sowing, the number of *Rotylenchulus reniformis* living in 500 mL of the soil was counted. In addition, measurement was also performed in the same manner for the case of sowing seeds not treated with Formulation Example 1 (compound (1)) (untreated). Table 4 below presents the results.

TABLE 4

| Treatment Group | Amount of Active Ingredient Treated [mg] | Number of Nematodes in Soil [Relative to Untreated] |
| --- | --- | --- |
| Compound (1) (Dust) | 2.0 | 53.8 |
| Untreated | — | 100 |

(Comparative Test Example 1) *Ascaridia galli* Control Test (in Vitro)

To 10 mL of a chemical solution prepared by using Ringer's solution so that the compound (1) or the compound (2) would have a predetermined concentration, 6 *Ascaridia galli* were introduced, and the solution was cultured in a water bath at 42° C. The number of surviving worms was counted 24 hours after the start of culture, and the mortal worm rate was calculated.

As a result, it was confirmed that both of the compound (1) and the compound (2) showed a mortal worm rate of 0 at a concentration of 50 ppm, and the compound (1) and the compound (2) showed no effect on animal endophytic nematodes.

(Comparative Test Example 2) *Hymenolepis diminuta* Control Test (in Vitro)

Rats were previously infected with Hymenolepis diminuta to prepare infected rats. Each of the three infected rats was orally administered with a chemical solution prepared to have a predetermined concentration of the compound (1) or compound (2), and 7 days after the administration, *Hymenolepis diminuta* in the small intestine of the rat was observed with a stereoscopic microscope to determine the control effect.

As a result, it was confirmed that neither the compound (1) nor the compound (2) had a control effect in the rat administered with 20 mg/kg, and the compound (1) and the compound (2) showed no effect on animal endophytic nematodes.

(Comparative Test Example 3) *Bursaphelenchus xylophilus* Control Test (In Vitro)

As a *Bursaphelenchus xylophilus* control test, the cotton ball test method was used to confirm the inhibitory effect on the proliferation of *Bursaphelenchus xylophilus*. First, a cotton ball (diameter 5 mm) of absorbent cotton was fixed with an insect needle, and a methanol solution prepared so that the compound (1) or the compound (2) was 2000 ppm was injected with a micropipette. The pressure was reduced in a desiccator for about 30 minutes, the solvent was removed by evaporation, and a test cotton ball was obtained. In addition, the gray mold as the test bacterium was cultured at 22° C. for 4 days in a Petri dish containing potato dextrose agar medium. Then, the test cotton ball was placed in the center of the Petri dish, and 1500 *Bursaphelenchus xylophilus* (100 μL of solution) were injected therein. This Petri dish was cultured at 26° C. for 5 days, and the feeding degree of the gray mold by *Bursaphelenchus xylophilus* was evaluated based on the following evaluation criteria. Further, evaluation was performed in the same manner when morantel was used instead of the compound (1) or (2). The evaluation results (scores) are presented in Table 5 below.

Evaluation Criteria

Score 1: no influence on feeding (no effect)
Score 2: feeding degree of 41% or more
Score 3: feeding degree of 21 to 40%
Score 4: feeding degree of 20% or less
Score 5: no feeding (great effect)

TABLE 5

| Test Compound | Amount of Active Ingredient Treated [µg/Cotton Ball] | Treatment Concentration [ppm] | Score |
|---|---|---|---|
| Compound (1) | 20 | 200 | 1 |
| Compound (2) | 20 | 200 | 1 |
| Morantel | 5 | 50 | 5 |

It was confirmed from the above results that the nematode control agent of the present invention specifically exhibited an excellent control effect against Tylenchoidea plant parasitic nematodes.

(Test Example 7) Soybean Growth Effect Test (Seed Dressing)

To the dressing dust presented in Formulation Example 1, genetically modified soybean seeds, a small amount of water, and a blue dye were added, and the mixture was stirred on a stirrer for several tens of seconds, thereby obtaining genetically modified soybean seeds uniformly smeared with this dust. These soybean seeds were sown in the soil previously inoculated with the eggs and larvae of *Meloidogyne incognita*. Then, 80 days after sowing, the plant height of the stems and leaves and the weight of the stems and leaves were measured to evaluate the effect of the compound (1) on the growth of soybean. In addition, the plant height of the stems and leaves and the weight of the stems and leaves were also measured in the same manner for the case of sowing seeds treated with an abamectin formulation (Avicta Complete, manufactured by Syngenta) instead of Formulation Example 1 (compound (1)) and for the case of sowing seeds treated with none of the compounds. Table 6 below presents the results. Note that Table 6 also presents the relative values of plant height (relative to untreated) when the untreated case was set to 100.

TABLE 6

| Treatment Group | Amount of Active Ingredient Treated [mg/seed] | Plant Height [cm] | Relative to Untreated | Weight [g] |
|---|---|---|---|---|
| Compound (1) (Dust) | 1.0 | 42 | 150 | 11.4 |
|  | 2.0 | 53 | 189.29 | 17.7 |
| Abamectin Formulation (Avicta Complete) | 0.151 | 21 | 75 | 11.8 |
| Untreated | — | 28 | 100 | 8.0 |

In addition, soybean seeds treated in the same manner as described above were sown in the soil inoculated with the eggs and larvae of *Heterodera glycines* or *Rotylenchulus reniformis* instead of *Meloidogyne incognita*, and the plant height of the stems and leaves and the weight of the stems and leaves were measured 80 days after sowing. Consequently, the same results as above were obtained.

(Test Example 8) Cucumber Growth Effect Test

Cucumber seeds and a small amount of water were added to the dressing dust shown in Formulation Example 1, and the mixture was stirred to obtain cucumber seeds smeared uniformly with this dust. The cucumber seeds were sown in a soil contaminated with Meloidogyne incognita. Then, 49 days after sowing, the plant height of the stems and leaves was measured to evaluate the effect of the compound (1) on the growth of cucumber.

In addition, the plant height of the stems and leaves was measured in the same manner for the case of sowing seeds not treated with Formulation Example 1 (compound (1)) (untreated). Table 7 below presents the results. Note that Table 7 also presents the relative values of plant height (relative to untreated) when the untreated case was set to 100.

TABLE 7

| Treatment Group | Amount of Active Ingredient Treated [mg/seed] | Plant Height [cm] | Relative to Untreated |
|---|---|---|---|
| Compound (1) (Dust) | 1.0 mg | 15.68 | 169.15 |
|  | 2.0 mg | 27.10 | 292.34 |
| Untreated | — | 9.27 | 100 |

(Comparative Test Example 4) Wheat Growth Effect Test

Each well of a 24-well plate was charged with 200 µL of a chemical solution prepared to have a final concentration of 10% acetone and a predetermined concentration of the compound (1), and the root of the sprouting wheat was immersed therein. Then, 3 days after the immersion, the plant height of the stems and leaves was measured to evaluate the effect of the compound (1) on the growth of wheat. In addition, the plant height of the stems and leaves was also measured for the case of sowing seeds not treated with the compound (1) (untreated). Table 8 below presents the results. Note that Table 8 also presents the relative values of plant height (relative to untreated) when the untreated case was set to 100.

TABLE 8

| Treatment Group | Treatment Concentration [ppm] | Plant Height [cm] | Relative to Untreated |
|---|---|---|---|
| Compound (1) | 50 | 9.87 | 106.1 |
|  | 100 | 9.20 | 98.9 |
|  | 200 | 9.20 | 98.9 |
| Untreated | — | 9.30 | 100 |

It was made clear from the above results that the nematode control agent of the present invention exhibited high plant safety and, moreover, had an excellent growth promoting effect specifically on dicotyledons.

(Test Example 9) *Meloidogyne incognita* Control Test 2

Seed Dressing

Cucumber seeds were sown one by one in a 9 cm pot filled with seedling-raising culture soil, where the seeds had been subjected to dressing treatment with a dressing dust presented in Formulation Example 1 so that the amount treated of the compound (1) would be a predetermined amount. Then, 13 days after sowing, seedlings were planted in a field contaminated with *Meloidogyne incognita*. Subsequently, 27 days after planting, the degree of gall formation on the roots of cucumber was classified by a visual inspection with the following five-step gall formation degree criteria according to the test method of the contract test of Japan Plant Protection Association. In this way, the gall index was calculated. In addition, the gall index was calculated in the same manner as described above except that, instead of Formulation Example 1, seeds were sown in the soil subjected to admixture treatment of 0.5% fluopyram granules (Velum Granule, manufactured by Bayer). Furthermore, the gall index was also calculated in the same manner for the case of sowing seeds treated with none of the compounds (untreated). Note that, in each group, 24 or 25 strains were investigated, and the results were their averages. Table 9 below presents the results. In Table 9, the dose administered indicates the amount of compound per cultivated area (the same applies hereinafter).

Calculation Formula for Gall Index $$\text{Gall index} = (0 \times a + 1 \times b + 2 \times c + 3 \times d + 4 \times e)/((a+b+c+d+e) \times 4) \times 100$$

a: number of strains that meet the gall formation degree criteria of 0, b: number of strains that meet the gall formation degree criteria of 1, c: number of strains that meet the gall formation degree criteria of 2, d: number of strains that meet the gall formation degree criteria of 3, and e: number of strains that meet the gall formation degree criteria of 4.

Gall Formation Degree Criteria

0 . . . no galls are observed in the entire root system
1 . . . clubs are slightly observed on the rootlets
2 . . . clubs are somewhat observed on the rootlets
3 . . . clubs are also observed on the main root
4 . . . clubs are especially large in number and size

TABLE 9

| Treatment Group | Active Ingredient | | Gall Index |
|---|---|---|---|
| | Amount Treated | Dose Administered | |
| Untreated | — | — | 50 |
| Compound (1) (Dust) | 2 mg/seed | 25 g/ha | 7.4 |
| 0.5% Fluopyram Granule (Velum Granule) | 20 kg/10a | 1000 g/ha | 5.6 |

From the above results, the nematode control agent of the present invention showed a high damage inhibitory effect equivalent to that of a conventional control nematicide at a low dose of 1/40 compared to the dose administered of the control nematicide used in a usual manner against *Meloidogyne incognita*.

(Test Example 10) *Pratylenchus penetrans* Control Test (Seed Dressing)

Radish seeds, subjected to dressing treatment with the dressing dust shown in Formulation Example 1 so that the amount treated of the compound (1) would be a predetermined amount, were sown in a field contaminated with *Pratylenchus penetrans*. They were harvested 77 days after sowing, and the number of damage marks on the root was indexed based on the following evaluation criteria. The root damage degree of the drug-treated group was calculated according to the following formula. In addition, the root damage degree was calculated in the same manner as described above except that, instead of Formulation Example 1, seeds were sown in the soil subjected to admixture treatment of 1.5%, imicyafos granules (Nemakick Granule, manufactured by Agro-Kanesho Co., Ltd.). Furthermore, the root damage degree was also calculated in the same manner for the case of sowing seeds treated with none of the compounds (untreated). Note that, in each group, a total of 40 strains were surveyed, 20 strains×2 iterations, and the results were their averages. Table 10 below presents the results.

Calculation Formula for Root Damage Degree $$\text{Root damage degree} = (0 \times a + 1 \times b + 2 \times c + 3 \times d + 4 \times e)/((a+b+c+d+e) \times 4) \times 100$$

a: number of strains that meet the root damage index criteria of 0, b: number of strains that meet the root damage index criteria of 1, c: number of strains that meet the root damage index criteria of 2, d: number of strains that meet the root damage index criteria of 3, and e: number of strains that meet the root damage index criteria of 4.

Root Damage Index Criteria

0 . . . no damage marks
1 . . . the number of damage marks is 1 to 5
2 . . . the number of damage marks is 6 to 10
3 . . . the number of damage marks is 11 to 20
4 . . . the number of damage marks is 21 or more

TABLE 10

| Treatment Group | Active Ingredient | | Root Damage Degree |
|---|---|---|---|
| | Amount Treated | Dose Administered | |
| Untreated | — | — | 43.8 |
| Compound (1) (Dust) | 2 mg/seed | 160 g/ha | 26.3 |
| 1.5% Imicyafos Granule (Nemakick Granule) | 15 kg/10a | 2250 g/ha | 14.4 |

From the above results, the nematode control agent of the present invention showed a high damage inhibitory effect equivalent to that of a conventional control nemaicide at a low dose of 1/14 or smaller compared to the dose administered of the control nematicide used in a usual manner also against *Pratylenchus penetrans*.

INDUSTRIAL APPLICABILITY

The nematode control agent and the nematode control method of the present invention are highly safe for non-target organisms and simple to use, and thus useful as a nematode control agent and a nematode control method which exhibit an excellent control effect against Tylenchoidea plant parasitic nematodes.

In addition, the nematode control agent and the nematode control method of the present invention have a specific growth promoting effect on dicotyledons, and thus make it possible to significantly improve the yield of agricultural crops such as cereals, beans, green grass for sugar production, vegetables, and fruit trees, particularly preferably crops such as soybean, cucumber, and radish.

The invention claimed is:

1. A method for controlling a Tylenchoidea plant parasitic nematode, comprising:
   treating a target with an effective amount of at least one compound selected from the group consisting of a compound represented by the following formula (1), a compound represented by the following formula (2), enantiomers thereof, and agriculturally and horticulturally acceptable acid addition salts thereof

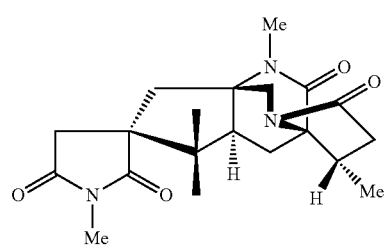
(1)

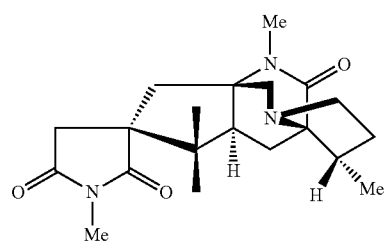
(2)

wherein the Tylenchoidea plant parasitic nematode is at least one plant parasitic nematode selected from the group consisting of *Meloidogyne incognita*, *Heterodera glycines*, and *Rotylenchulus reniformis*.

2. The method for controlling a plant parasitic nematode according to claim 1, wherein the target is at least one selected from the group consisting of Tylenchoidea plant parasitic nematodes, plants, soil, and culture carriers other than the soil.

3. The method for controlling a plant parasitic nematode according to claim 2, wherein the target is soil or a culture carrier other than the soil, and the effective amount is 0.1 g to 1000 g per 10 are of the soil.

4. The method for controlling a plant parasitic nematode according to claim 2, wherein the target is a plant seed, and the effective amount is 0.01 g to 100 g per 1 kg of the plant seed.

5. The method for controlling a plant parasitic nematode according to claim 1, further comprising: treating at least one target selected from the group consisting of dicotyledons, soil, and culture carriers other than the soil with the effective amount of the compound, wherein the method is also a method for promoting growth of the dicotyledons.

6. A method for controlling a Tylenchoidea plant parasitic nematode, comprising:
   treating a target with a control agent comprising at least one compound selected from the group consisting of a compound represented by the following formula (1), a compound represented by the following formula (2), enantiomers thereof, and agriculturally and horticulturally acceptable acid addition salts thereof as an active ingredient with an effective amount of the active ingredient

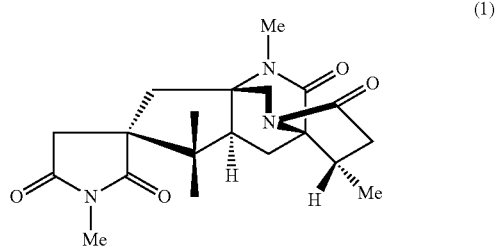
(1)

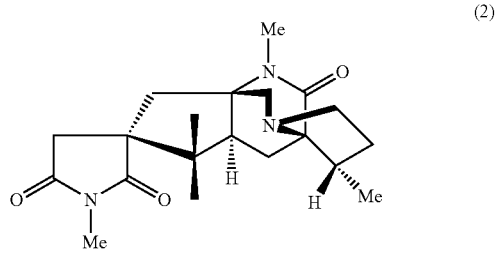
(2)

wherein the Tylenchoidea plant parasitic nematode is at least one plant parasitic nematode selected from the group consisting of *Meloidogyne incognita*, *Heterodera glycines*, and *Rotylenchulus reniformis*.

7. The method for controlling a plant parasitic nematode according to claim 6, wherein the control agent further comprising a powdery carrier, and being a dust or a powder formulation.

8. The method for controlling a plant parasitic nematode according to claim 6, wherein the control agent further comprising a granular or powdery carrier and a surfactant, and being a granule or a dust-granule mixture.

9. The method for controlling a plant parasitic nematode according to claim 6, wherein the control agent further comprising a liquid carrier, a surfactant, and a thickener, and being a flowable formulation.

10. The method for controlling a plant parasitic nematode according to claim 6, wherein the control agent further comprising a powdery carrier and a surfactant, and being a wettable powder.

11. The method for controlling a plant parasitic nematode according to claim 6, wherein the target is at least one selected from the group consisting of Tylenchoidea plant parasitic nematodes, plants, soil, and culture carriers other than the soil.

12. The method for controlling a plant parasitic nematode according to claim 6, wherein the target is soil or a culture carrier other than the soil, and the effective amount is 0.1 g to 1000 g per 10 are of the soil.

13. The method for controlling a plant parasitic nematode according to claim 6, wherein the target is a plant seed, and the effective amount is 0.01 g to 100 g per 1 kg of the plant seed.

14. The method for controlling a plant parasitic nematode according to claim 6, further comprising: treating at least one target selected from the group consisting of dicotyledons, soil, and culture carriers other than the soil with the effective amount of the compound, wherein the method is also a method for promoting growth of the dicotyledons.

* * * * *